Aug. 12, 1924.   1,504,436
D. DAUGHLEY
SHAVING GAUGE
Filed Oct. 16, 1923

Inventor
Dekran Daughley.
By Arthur Scrivenor.
Attorney

Patented Aug. 12, 1924.

1,504,436

UNITED STATES PATENT OFFICE.

DEKRAN DAUGHLEY, OF RICHMOND, VIRGINIA.

SHAVING GAUGE.

Application filed October 16, 1923. Serial No. 668,803.

*To all whom it may concern:*

Be it known that I, DEKRAN DAUGHLEY, a citizen of the United States, residing at Richmond, in the county of Henrico and State of Virginia, have invented a new and useful Shaving Gauge, of which the following is a specification.

My invention relates to shaving gauges, and it has for its object the providing of a simple and sanitary means whereby the razor edge may be guided in shaving the hair immediately in front of the ear. Those who shave themselves sometimes have difficulty in cutting a neat line before the ear; and in cutting this line on either side of the face at the same height. By the help of my device the shaver can with certainty cut both lines straight and at one level.

Figure 1:
Figure 2:
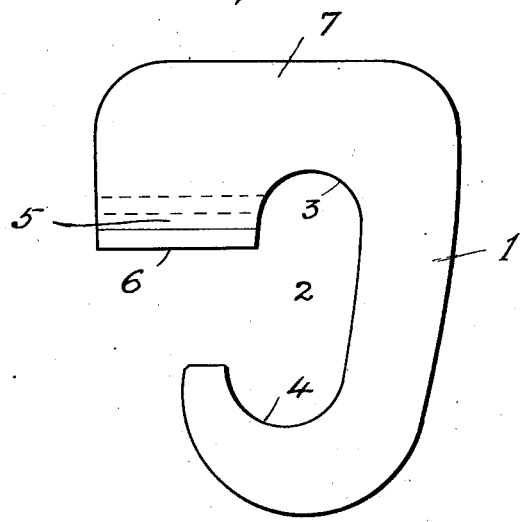

In the drawing accompanying this specification Figure 2 is a side elevation of my shaving gauge; and in Figure 1 is shown the side view of a man's head, with my shaving gauge in position.

Referring to Fig. 2: the numeral 1 indicates the gauge, which is adapted to embrace the ear in the opening 2; the upper part at 3 hooking behind the helix of the ear, and the lower part at 4 hooking under the lobe. Preferably my gauge is formed of thin celluloid, or sheet rubber, or other material which may be washed and sterilized without losing its shape; and which has enough elasticity to permit the user to adapt it to the ear and side of the head. If the gauge is made of thicker material, its working edge 6 is bevelled, so that it may lie close to the hair. The gauge may be adapted to the size of any ear by trimming the opening 2. Additional security may be given to the gauge during the operation of shaving by passing the free hand over the head and allowing the finger tips to press lightly against its upper surface, at 7.

When shaving, the razor is laid flat, and in a horizontal position, against the gauge at 5. It is then drawn downward, the razor edge cutting the hair as it passes the edge 6.

One user may prefer longer side-whiskers than another; and to meet differences of taste in this respect the gauge edge 6 may be trimmed as to height, as indicated by the dotted lines.

I claim:

1. A shaving gauge consisting of a substantially flat and thin element adapted to embrace the ear and to lie against the side of the head, and having in its forward portion an edge to form a gauge to which the hair may be trimmed.

2. A shaving gauge consisting of a substantially flat and thin element having an edge adapted to act as a gauge to trimming the hair before the ears, and having a depending portion adapted to engage the ear and whereby the gauge is held in position against the side of the head.

3. A shaving gauge consisting of a thin flexible element adapted to lie against the head above and before the ear, and having a part adapted to act as a gauge for the trimming of the hair before the ear, and also having a flexible part adapted to engage the back and lower part of the ear to hold the gauge in position.

DEKRAN DAUGHLEY.